United States Patent [19]

Prevot

[11] Patent Number: 4,922,223
[45] Date of Patent: May 1, 1990

[54] EMERGENCY IDENTIFIER FOR VEHICLES

[76] Inventor: Roderick Q. Prevot, 5035 Marks La., Indianapolis, Ind. 46226

[21] Appl. No.: 234,587

[22] Filed: Aug. 22, 1988

[51] Int. Cl.$^5$ .............................................. B60Q 7/00
[52] U.S. Cl. ..................................... 340/473; 340/471; 340/321; 340/908; 40/431; 40/446; 40/518; 40/592; 40/610; 362/226
[58] Field of Search ................. 340/114 R, 114 B, 84, 340/87, 81 R, 908.1, 90, 122–125, 143–145, 815.08, 815.09, 740, 792, 724, 727, 471–473, 321, 908; 40/518, 592, 431, 446, 529, 531, 532, 610, 612, 571, 591; 362/226, 257, 249, 190, 191; 116/63 R, 63 P

[56] References Cited

U.S. PATENT DOCUMENTS

| | | | |
|---|---|---|---|
| 2,843,952 | 7/1958 | Zgraggen | 40/52 |
| 3,497,980 | 3/1970 | Brown | 40/129 |
| 3,513,577 | 5/1970 | Kleinman | 40/518 |
| 3,668,797 | 6/1972 | Gray | 40/130 |
| 3,761,890 | 9/1973 | Fritts et al. | 340/123 |
| 3,772,811 | 11/1973 | Alsup | 40/129 C |
| 3,790,937 | 2/1974 | Munroe | 340/123 |
| 3,810,092 | 5/1974 | Tucker | 340/473 |
| 4,070,775 | 1/1978 | Brooks | 40/492 |

FOREIGN PATENT DOCUMENTS 1248488 10/1971 United Kingdom .

Primary Examiner—Donnie L. Crosland
Attorney, Agent, or Firm—Willian Brinks Olds Hofer Gilson & Lione

[57] ABSTRACT

An emergency-identifying apparatus for motor vehicles for displaying highly visible messages to approaching motorists. The apparatus includes a housing having an opening positioned in at least one side thereof, a rotatable member supported within the housing and having a plurality of message plates thereon, each of the message plates bearing a different message indicia thereon, means coupled to the rotatable member and positioned externally of the housing to position a selected message plate in alignment with the opening, a light source for illuminating the selected message plate from behind to render the desired message indicia thereon readily visible, and means for supporting the housing at a desired location to permit the message indicia on the selected message plate to be readily visible to oncoming motorists or the like. The apparatus can be easily and quickly set-up and operated by one person and can readily be stored in a vehicle trunk or other convenient location when not in use.

16 Claims, 5 Drawing Sheets

EMERGENCY IDENTIFIER FOR VEHICLES

TECHNICAL FIELD

This invention relates to warning devices, and, more particularly, to a portable, emergency-identifying apparatus for motor vehicles to advise approaching motorists of emergency situations, traffic hazards or other unusual circumstances on the roadway.

BACKGROUND ART

Warning devices for motor vehicles are useful in many situations. When an automobile is disabled due to an accident or automobile failure, it may constitute a traffic hazard to approaching vehicles, and it is desirable to warn approaching motorists of the disability. Also, assistance is frequently not readily available in such situations due to the remoteness of the location in which the disability occurs or the reluctance of passing motorists to stop and render assistance. In certain instances, an occupant of a disabled or stopped vehicle may require immediate medical attention; and, especially in such circumstances, it is crucial that passing motorists be alerted of the emergency in order to obtain prompt assistance.

One prior warning device, disclosed in U.S. Pat. No. 3,810,092, comprises a pair of rigid panels which are adapted to be removably mounted to the roof of a vehicle by suction cup feet. A plurality of message cards are supported between the panels, each bearing a different word. The cards are selectively slidable from their normal hidden position between the panels to an exposed, extended position to permit a message carried by one or a combination of the cards to be seen by oncoming motorists. One or more signal lights may also be mounted to the panels to further alert oncoming motorists.

The device shown in U.S. Pat. No. 3,810,092 would appear to have only limited visibility, particularly at night or during adverse weather conditions. The device also appears rather bulky and difficult to handle and store.

U.S. Pat. No. 2,843,952 discloses a warning device which is built into a motor vehicle. Such a device would appear to be prohibitively expensive and highly complex. Yet other prior vehicle warning systems are described in U.S. Pat. Nos. 3,668,797; 3,497,980; 3,772,811; and 4,070,775.

An effective warning device for motor vehicles must be capable of displaying a message that is highly visible and legible to approaching motorists, even at night or during adverse weather conditions when visibility is limited. A suitable device should also be portable so that it can easily be set-up for use by a single person, and compact so that it can conveniently be stored in a vehicle. A bulky warning device which is impractical to use or store within the vehicle will most likely be left at home, thereby rendering the warning device useless.

DISCLOSURE OF THE INVENTION

This invention comprises an emergency-identifying apparatus for a vehicle which is portable, lightweight, compact, simply constructed and easy to set-up and use; and which displays a highly visible message alerting approaching motorists of adverse conditions in the roadway, of special needs of the driver or other occupant of the vehicle or of other unusual situations.

The apparatus of the invention comprises a housing having a first opening positioned in at least one side thereof, a rotatable member supported within the housing and having a plurality of message plates affixed thereto, each of the message plates bearing a different message indicia thereon, means coupled to the rotatable member and positioned externally of the housing for operating the rotatable member to position a selected message plate in alignment with the first opening, a first light source supported within the housing for illuminating the selected message plate from behind to render the desired message indicia thereon readily visible, and means for supporting the housing at a desired location to permit the message indicia on the selected message plate to be readily visible to oncoming motorists or the like.

Each of the message plates carries a different message indicia, citing the needs of the operator or other occupant of a vehicle, advising approaching vehicles of adverse or unusual conditions existing on or near the roadway or of other unusual situations. Typical messages might include "accident", "stalled car", "emergency", "medical help needed", and the like.

According to a presently preferred embodiment of the invention, the rotatable member comprises an endless belt member supported around a plurality of rollers, and the message plates are affixed to the belt member at spaced locations therearound. One of the rollers comprises a drive roller, and the means coupled to the rotatable member comprises a rotatable knob positioned externally of the housing and coupled to the drive roller for positioning a selected one of the message plates in alignment with the first opening.

In use, the message plate bearing a desired message indicia may be displayed by rotating the knob until the desired message plate is aligned with and visible through the first opening of the housing. The first light source is then energized to illuminate the selected message plate from behind, thereby rendering the message indicia thereon readily visible and legible to approaching motorists at a substantial distance.

According to a further aspect of the invention, the housing includes means for providing an additional message or messages on the at least one side thereof, and a second light source supported within the housing for illuminating the additional message from behind. The additional message is preferably provided on a removable, additional message plate mounted in a second opening in the at least one side of the housing.

The first and second light sources preferably produce light of different color, e.g., red and yellow; and a partition is preferably positioned within the housing between the first and second light sources to isolate the light emitted from the sources from one another. The first light source, in particular, may be a flashing red light to more quickly attract the attention of approaching motorists.

The support means according to a preferred embodiment of the invention comprises a base member incorporated into or attached to the housing and having a magnetic portion thereon or magnets affixed thereto for detachably securing the apparatus to a metallic surface of a vehicle. In addition, the base member includes means for detachably receiving a vertical support member for supporting the housing at an elevated position above the ground when such placement is desired. The vertical support member is preferably collapsible for easy storage and is wrapped in a reflective tape for enhanced visibility.

The apparatus of the invention also includes alternative means for providing power to the light sources including a battery pack adapted to be carried in the base member, and external wiring means adapted to be plugged into the vehicle cigarette lighter.

The apparatus of the invention provides a bright, highly visible message which can be seen and read by approaching motorists from a substantial distance. The apparatus can be quickly and easily set-up and operated by one person, and can readily be stored in a vehicle trunk or other convenient location when not in use.

Further advantages and other features of the invention will become apparent hereinafter in conjunction with the following detailed description of the best mode for carrying out the invention.

BEST MODE FOR CARRYING OUT THE INVENTION

Figure 1:
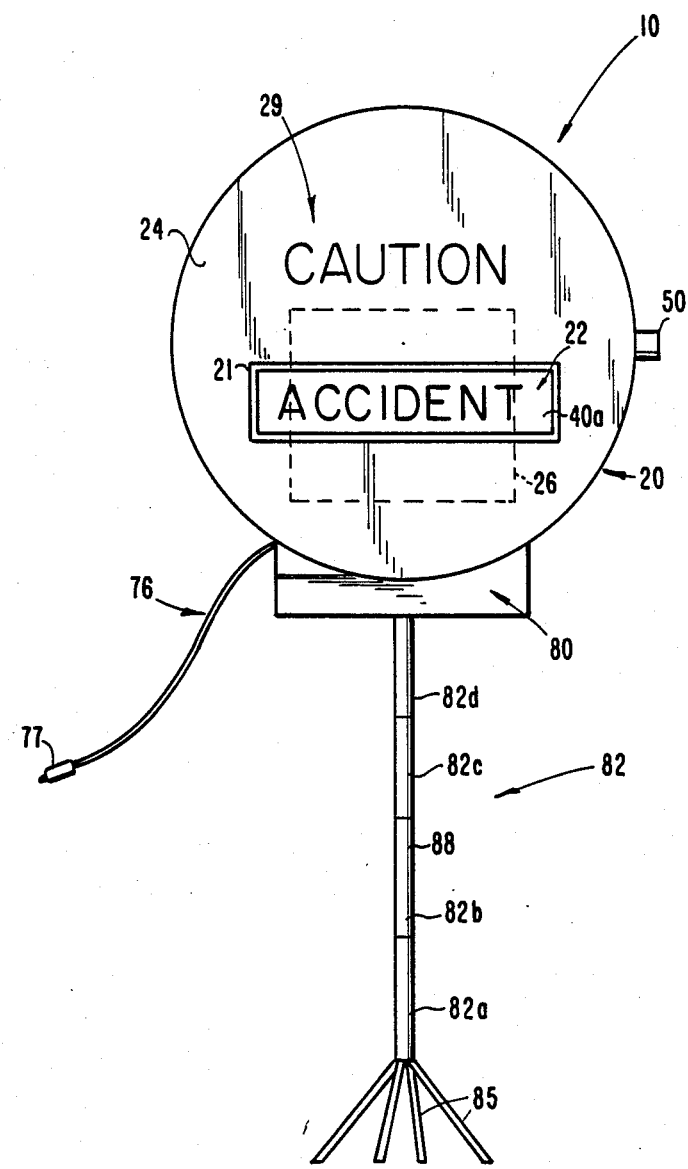
FIG. 1 is a perspective front view of an emergency-identifying apparatus according to a presently preferred embodiment of the invention.
Figure 2:
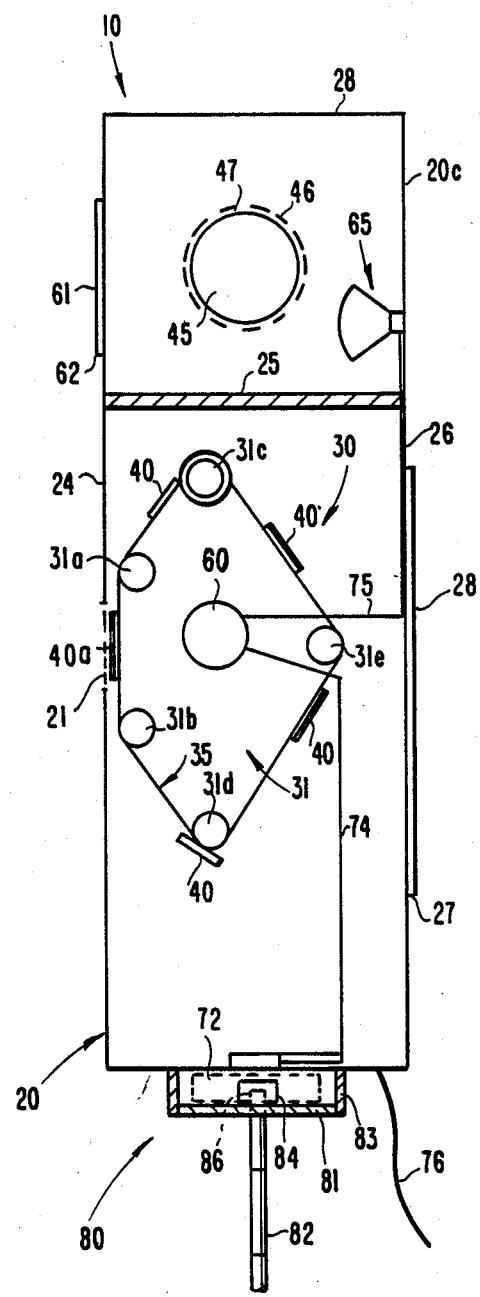
FIG. 2 is a side view, partially in cross-section, of the apparatus of FIG. 1.
Figure 3:
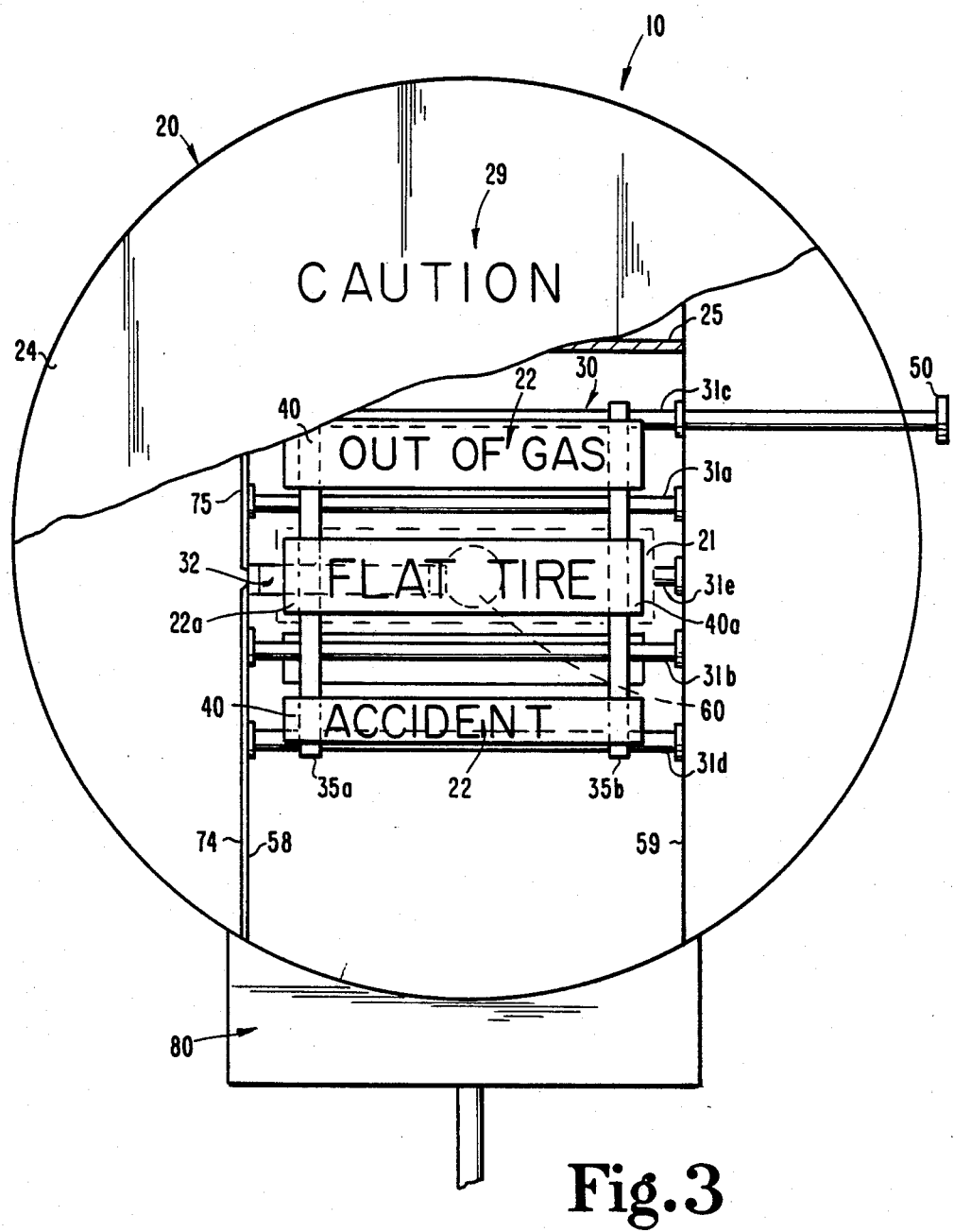
FIG. 3 is a front perspective view of the apparatus of FIG. 1 with a portion of the front surface removed to show certain interior structure thereof.

FIGS. 1-3 illustrate an emergency-identifying apparatus 10 according to a presently preferred embodiment of the invention. Apparatus 10 comprises a housing 20 of generally cylindrical shape which includes a front side 24, a back side 26 and a peripheral wall 28. Housing 20 is preferably formed of plastic or another suitable light-weight material to facilitate handling of the apparatus and to reduce manufacturing costs.

A first, generally rectangular-shaped opening 21 is positioned on at least the front side 24 of housing 20, and a rotatable member 30 is supported within housing 20. Rotatable member 30 has a plurality of message plates 40 affixed thereto which are adapted to be selectively positioned in alignment with opening 21.

Each message plate 40 carries a different message indicia 22 describing, for example, the special needs of the operator or other occupant of a vehicle, adverse or unusual road conditions immediately ahead of the vehicle, or other information to be conveyed to an oncoming motorist. Each message plate 40 is preferably transparent and the message indicia 22 thereon is preferably opaque. Alternatively, indicia can be transparent while the background provided by message plate 40 is opaque.

Rotatable member 30 comprises an endless belt member 35 supported around a system of rollers 31 which comprises a plurality of rollers 31a-31e. One of the rollers, roller 31c, comprises a drive roller and is connected to a rotatable knob 50 positioned externally of the housing 20 to permit endless belt member 35 to be driven around the roller system from outside the housing to position a desired message plate 40a in alignment with first opening 21 to render message indicia 22a thereon visible to an approaching motorist.

As shown in FIG. 3, rollers 31a-31e are supported between a pair of vertical support members 58 and 59. Endless belt member 35 preferably comprises a pair of spaced, relatively narrow endless belts 35a and 35b, supported adjacent each end of rollers 31a-31e. Message plates 40 are affixed to belts 35a and 35b and extend therebetween. The spacing between the belts is such that the message indicia on the message plates is positioned between the belts and is not covered by the belts.

A first light source 60 is positioned within housing 20 to illuminate the selected message plate 40a that is in alignment with the first opening 21 in the one side of the housing. Light source 60 preferably comprises a light bulb and can be mounted in a socket 32 supported on one of the support members 58 as shown in FIG. 3, so as to be positioned generally within the roller system 31 and behind the selected message plate 40a. When actuated, light source 60 will illuminate the selected transparent message plate 40a from behind permitting the message indicia thereon to be readily seen and read from a substantial distance.

Housing 20 further includes additional message indicia 29 positioned on at least side 24, and a second internal light source 65, such as a light bulb, supported within housing 20 for illuminating additional message indicia 29 from behind. In FIG. 1, the additional message indicia 29 comprises the word "CAUTION" and is formed in side 24. It is to be appreciated that other messages may appear in this position, if desired, including non-urgent messages. Also, in further embodiments of this invention, and as shown in FIG. 2, additional message indicia 29 may be positioned on a removable, additional message plate 61 mounted within a second opening 62 in side 24 of housing 20 to allow the substitution of different additional messages when desired. In such embodiments, the additional message plate can be transparent with opaque lettering or have transparent lettering on an opaque background.

The light projected by the first light source is preferably a highly visible, red color, while the light projected by the second light source is preferably a highly visible, yellow color, although the scope of this invention is not intended to be limited by the choice of any color(s) for the lights. Also, at least the first light source preferably comprises a flashing red light to more quickly attract the attention of approaching motorists.

Housing 20 preferably also includes partitioning structure 25 within housing 20 between first and second light sources 60 and 65 to isolate the light projected by the sources from one another.

Figure 5:
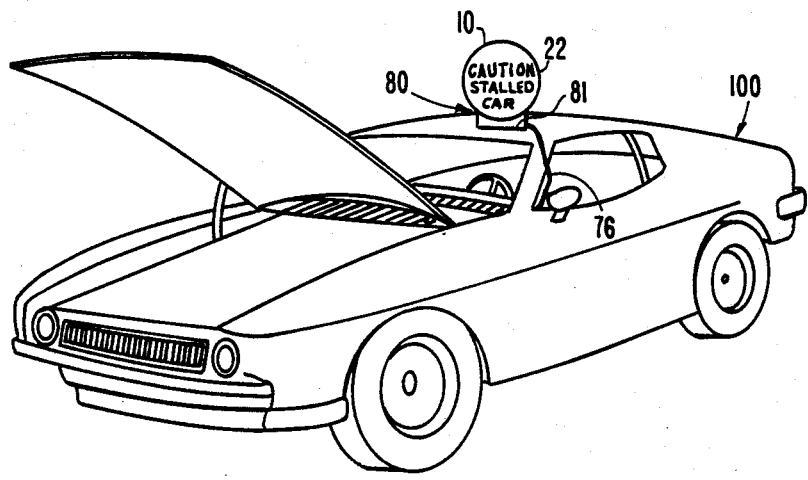
FIG. 5 is a perspective view showing an alternative manner of using the apparatus of this invention.

Housing 20 is adapted to be supported in a position which is readily visible to oncoming motorists. In many situations, it will be desirable to support the housing directly on the vehicle; and, to this end, housing 20 includes a base member 80 which includes a rectangular-shaped collar member 83 attached at the bottom of housing 20, and a flat base plate 81 which is adapted to be connected to the collar 82. Base plate 81 may be formed of a magnetic material or have one or more magnets attached to the lower surface thereof to permit the apparatus to be removably mounted to the hood or roof of a vehicle or to another metallic surface as shown in FIG. 5.

Figure 4:
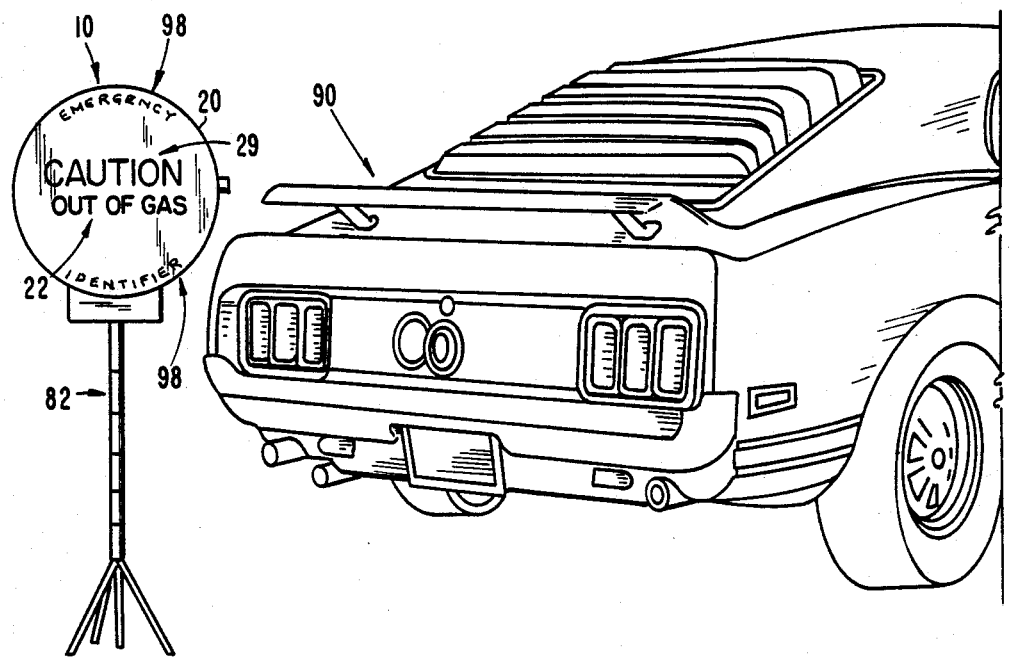
FIG. 4 is a perspective view showing one manner of using the apparatus of this invention.

In addition, apparatus 10 includes a vertical support member 82 which is adapted to be detachably secured to base member 80. As shown in FIG. 2, base plate 81a includes an inwardly extending boss 84 having a threaded opening 86 therein. The upper end of vertical support member 82 is externally threaded to be received in opening 86 to provide a vertical support to support housing 20 at an elevated position on the ground adjacent to a vehicle or at another suitable location as illustrated in FIG. 4. Support member 82 preferably includes support legs 85 for properly supporting the apparatus on the ground.

As shown in FIG. 1, support member 82 is preferably collapsible for easy storage. In this regard, support legs 85 may be collapsed and retracted upwardly into lower portion 82a of the support member, portion 82a retracted into portion 82b, portion 82b retracted into portion 82c and portion 82c retracted into portion 82d. A reflective tape, designated by reference number 88 in FIG. 1, is preferably wrapped around the support member 82 for enhanced visibility, particularly at night.

The first and second light sources 60 and 65 can be powered from either a battery pack 72 or from the cigarette lighter of a vehicle via external wiring means 76. Battery pack 72 is conveniently positioned in base member 80 as shown in FIG. 2, and is connected to the light sources by appropriate internal wiring 74 and 75 illustrated schematically. External wiring means 76 is connected to the internal wiring means 74, 75 and terminates in a plug 77 insertable into the cigarette lighter of the vehicle.

In a presently preferred embodiment of the invention, a further opening 45 may be provided in peripheral wall 28 of housing 20 to provide access to the upper interior of housing 20 above partitioning structure 25 to permit light source 65 to be replaced or for other purposes. Opening 45 may be covered by a removable panel 46 which, for example, is slidable or pivotable between positions covering opening 45 and exposing the opening.

Yet a further opening 27 may be positioned in rear wall 26 of housing 20 to provide access to the lower interior of housing 20 below partitioning structure 25. Opening 27 is also preferably covered by a movable panel 28 which is slidable or pivotable between a first position covering opening 27, and a second position allowing access through the opening to repair or inspect the first light source, or the rotatable member or to replace one or more of the message plates on the rotatable member. In this regard, the message plates 40 can be supported on the endless belts by clips or other appropriate means that will permit the plates to be removed or replaced when desired, for example, to provide plates having different message indicia thereon.

In using the apparatus of this invention, the operator may selectively display a desired message indicia 22 carried on a message plate 40 by rotating knob 50 until the selected message plate 40a bearing the desired indicia 22a is positioned in alignment with first opening 21 (shown in dotted line in FIGS. 2 and 3). First light source 60 illuminates the selected message plate from behind, thereby rendering the displayed message indicia thereon readily visible to approaching motorists.

The message indicia appearing upon the message plates may comprise, for example, "flat tire", "out of gas", "accident", "emergency stop", "car stalled", or any other message which cites a need of the operator or other occupant of the vehicle or alerts passing motorists of unusual or adverse conditions.

In FIG. 4, apparatus 10 is shown in use with a vehicle 90 wherein apparatus 10 is supported adjacent the vehicle by vertical support member 82 and is provided with electrical power from the battery pack 76. Additional "CAUTION" indicia 29 is illuminated by the second light source while message indicia 22 (shown in FIG. 4 as "OUT OF GAS") is illuminated by the first light source. Housing 20 may also be adapted to carry additional information 98 such as advertising or the like at other available locations on the front or back face thereof as shown in FIG. 4.

FIG. 5 shows apparatus 10 in use with a disabled vehicle 100 wherein the apparatus is supported on the roof of the vehicle by the magnetic base plate 81. Electrical power is provided to apparatus 10 in FIG. 5 through external wiring means 76 plugged into the cigarette lighter of the vehicle. In FIG. 5, the selected message indicia is "STALLED CAR".

To be fully effective, the messages displayed by apparatus 10 should be legible to an approaching motorist at a distance of at least about 200 feet. To achieve this, the message indicia on message plates 40 and the additional indicia 29 should be at least about 2 to 2½ inches high.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the following claims, and it is not intended to limit the invention other than is required by the scope of the following claims.

I claim:

1. An emergency-identifying apparatus for vehicles, comprising:
    a housing having a first opening positioned in at least one side thereof;
    flexible belt means carried on a plurality of rollers within said housing, said belt means having a plurality of message plates affixed thereto, each of said message plates bearing a different message indicia thereon;
    a rotatable member positioned externally of said housing and coupled to at least one of said plurality of rollers, said rotatable member being adapted to rotate said at least one roller to drive said belt means to position a selected one of said message plates in alignment with said first opening to render the message indicia thereon visible through said first opening;
    a first source means supported within said housing for illuminating said selected message plate from behind;
    means for providing power to said first light source means;
    first support means for supporting said housing at an elevated position above the ground; and
    second support means for supporting said housing on a vehicle.

2. The emergency-identifying apparatus of claim 1 wherein said message plates comprises substantially transparent message plates, and wherein said message indicia on said message plates are substantially opaque.

3. The emergency-identifying apparatus of claim 1 wherein said message indicia on each of said message plates are transparent and said message plates provide an opaque background for said message indicia.

4. The emergency-identifying apparatus of claim 1 wherein said first light source means comprises a flashing red light source.

5. The emergency-identifying apparatus of claim 1 further comprising additional message indicia positioned on said at least one side of said housing, and second light source means supported within said housing for illuminating said additional message indicia from behind.

6. The emergency-identifying apparatus of claim 5 wherein said additional message indicia comprises the word "CAUTION".

7. The emergency-identifying apparatus of claim 5 further comprising an internal partition within said housing for isolating the light projected by said first and second light source means from one another.

8. The emergency-identifying apparatus of claim 5 wherein said second light source means comprises a yellow light source.

9. The emergency-identifying apparatus of claim 1 wherein said first support means comprises a base member of said housing having magnetic means for mounting said housing on a vehicle or other metallic surface.

10. The emergency-identifying apparatus of claim 1 wherein said second support means comprises a vertical support member for supporting said housing at an elevated position above the ground, and means for detachably mounting said vertical support member to said housing.

11. The emergency-identifying apparatus of claim 10 wherein said vertical support member is collapsible for easy storage.

12. The emergency-identifying apparatus of claim 10 wherein said vertical support member is wrapped with reflective tape for enhanced visibility.

13. An emergency-identifying apparatus for vehicles comprising:
a housing
a message-supporting member on said housing, said message-supporting member bearing a message indicia thereon;
illumination means in said housing for illuminating said message-supporting member from behind to render said message indicia thereon readily visible; and
support means for supporting said housing at a desired location to permit said message indicia to be readily visible to oncoming motorists and the like; said support means comprising:
first support means for supporting said housing on a vehicle; and
second support means for supporting said housing at an elevated position above the ground, said second support means including a vertical support member and means for detachably attaching said vertical support member to said housing for supporting said housing at an elevated position above the ground.

14. The emergency-identifying apparatus of claim 13 wherein said first support means includes magnetic means for mounting said housing on a vehicle.

15. The emergency-identifying apparatus of claim 13 wherein said vertical support member is collapsible for easy storage.

16. The emergency-identifying apparatus of claim 13 wherein said vertical support member includes reflective means to provide enhanced visibility.

* * * * *